(12) United States Patent
Lin et al.

(10) Patent No.: US 10,903,907 B1
(45) Date of Patent: Jan. 26, 2021

(54) SYSTEM COMPRISING PACKAGED OPTICAL DEVICES

(71) Applicant: Advanced Semiconductor Engineering, Inc., Kaohsiung (TW)

(72) Inventors: Chang-Yu Lin, Kaohsiung (TW); Cheng-Yuan Kung, Kaohsiung (TW); Hung-Yi Lin, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 16/702,209

(22) Filed: Dec. 3, 2019

(51) Int. Cl.
*H04B 10/00* (2013.01)
*H04B 10/40* (2013.01)
*G02B 6/42* (2006.01)
*H04J 14/00* (2006.01)

(52) U.S. Cl.
CPC .......... *H04B 10/40* (2013.01); *G02B 6/4206* (2013.01); *G02B 6/4257* (2013.01)

(58) Field of Classification Search
CPC .............................. G02B 6/426; G02B 6/0083
See application file for complete search history.

(56) References Cited

U.S. PATENT DOCUMENTS

| | | | | |
|---|---|---|---|---|
| 2012/0039562 A1* | 2/2012 | Tan | ........................ | G02B 6/325 385/14 |
| 2013/0294730 A1* | 11/2013 | Leigh | .................. | G02B 6/4292 385/53 |
| 2014/0178079 A1* | 6/2014 | Yagisawa | ............. | H05K 1/0274 398/139 |
| 2014/0193160 A1* | 7/2014 | Yagisawa | ............. | G02B 6/4269 398/136 |
| 2019/0045619 A1* | 2/2019 | Yan | ...................... | H05K 1/0206 |
| 2020/0150364 A1* | 5/2020 | Leigh | .................. | G02B 6/4261 |

* cited by examiner

*Primary Examiner* — Daniel G Dobson
(74) *Attorney, Agent, or Firm* — Foley & Lardner LLP (57) ABSTRACT

A system including optical devices is provided. The system includes a first substrate and a first device for optical communication. The first device has a first surface, a second surface opposite to the first surface, and a first side contiguous with the first surface and the second surface. Moreover, the first side is smaller than one of the first surface and the second surface in terms of area. The first device is attached at the first side thereof to the first substrate.

17 Claims, 6 Drawing Sheets

SYSTEM COMPRISING PACKAGED OPTICAL DEVICES

BACKGROUND

1. Field of the Disclosure

The present disclosure generally relates to a system comprising packaged devices and, in particular, to a system comprising packaged optical devices for optical communication.

2. Description of the Related Art

Along with the rapid growth and thriving development in optical communication industry, attention has been paid to increasing transmission rate while reducing power loss. For example, to enhance power efficiency, an optical transceiver may be placed closer to an optical switch. In addition, to improve area efficiency, the number of optical transceivers that can be served by an optical switch may be maximized to thereby increase the transceiver density.

SUMMARY

Embodiments of the present disclosure provide a system comprising optical devices. The system includes a first substrate and a first device for optical communication. The first device has a first surface, a second surface opposite to the first surface, and a first side contiguous with the first surface and the second surface. Moreover, the first side is smaller than one of the first surface and the second surface in terms of area. The first device is attached at the first side thereof to the first substrate.

Embodiments of the present disclosure also provide a system comprises optical devices. The system includes a substrate, a first device and a second device. The first device, for optical communication, has a first planar surface smaller than a second planar surface in terms of area. The first device is attached at the first planar surface thereof to the substrate. The second device is disposed on the substrate and serves the first device during an optical communication.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some comparative systems, optical transceivers are attached at a relatively large surface thereof to a substrate in a "lying" posture. Consequently, the number of optical transceivers that can be arranged on the substrate is restricted. Further, the bandwidth resources provided by an optical switch device available for optical transceivers are underutilized. In some embodiments of the present disclosure, first devices that act as optical transceivers are attached at a relatively small side or planar surface thereof to a substrate in a "standing" posture. The number of first devices that can be arranged on the substrate, or the density of the first devices, is significantly increased. As a result, optimized utilization of bandwidth resources is achieved.

Figure 1A:
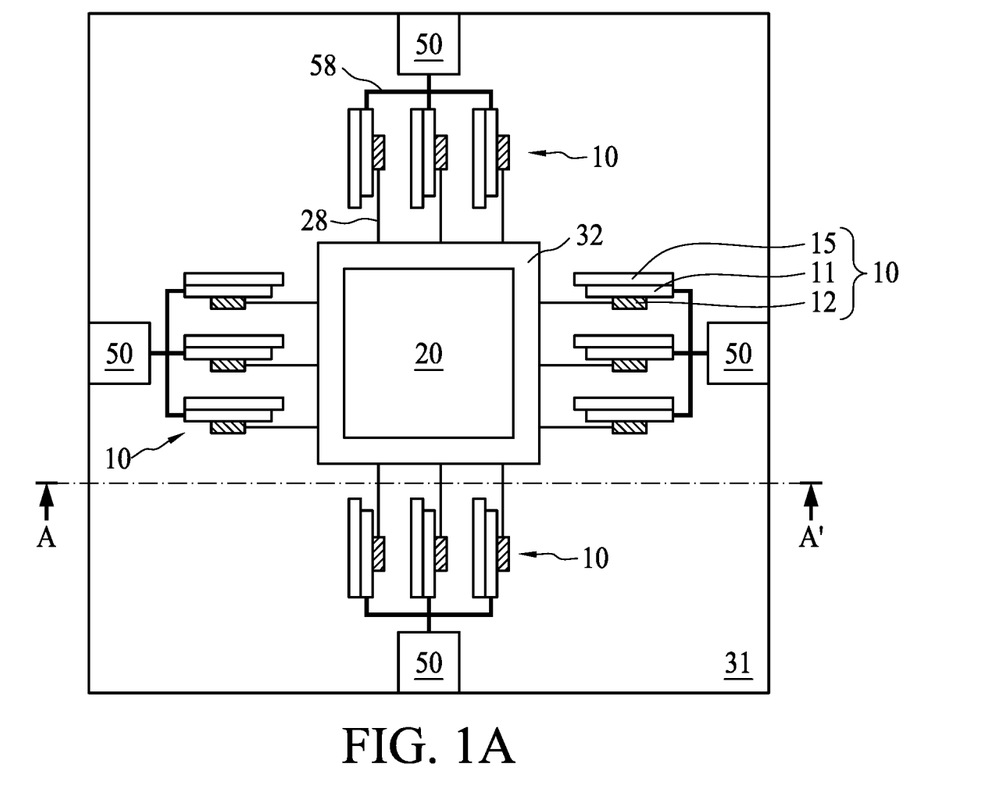
FIG. 1A is a schematic top view of a system comprising optical devices, in accordance with an embodiment of the present disclosure.

FIG. 1A is a schematic top view of a system 100 comprising optical devices 10 and 20, in accordance with an embodiment of the present disclosure.

Referring to FIG. 1A, the system 100 includes first devices 10 and a second device 20. The first device 10 functions to act as an optical transceiver, while the second device 20 acts as a processor or controller that serves these first devices 10 during an optical communication. The first device 10 includes a first module 11 and a second module 12 on a carrier 15. In the present embodiment, the first module 11 includes a photonic integrated circuit (PIC) configured to, during a receiving operation, receive an optical signal from an external system and convert the received optical signal into an electric signal. In addition, the second module 12 includes an electric IC (EIC) configured to, during a receiving operation, demodulate an electric signal from the first module 11 and send the demodulated electric signal to the second device 20. As a result, information conveyed in the optical signal from an external system is received, decoded by the first device 10 and sent to the second device 20 during a receiving operation. Moreover, the electric IC of the second module 12 is configured to, during a transmission operation, modulate the waveform of a light wave emitted from a light source 50 via an optical fiber 58 towards the first module 11, thereby encoding information from the second device 20 in the light wave, resulting in an optical signal in the form of a carrier wave. In addition, the photonic IC of the first module 11 is configured to, during a transmission operation, transmit the optical signal to an external system. As a result, information from the second device 20 is encoded in the carrier wave and transmitted to an external system during a transmission operation.

The first module 11 of the first device 10 is connected via an optical fiber 58 to a corresponding light source 50. Moreover, the second module 12 is electrically connected via a conductive line 28 such as a copper wire to the second device 20. In the present embodiment, the light sources 50, which may include laser light sources, are disposed on the first substrate 31. Alternatively, a light source 50 may be disposed on the second module 12 of the first device 10 and connected to the second module 12 via an optical fiber.

The first devices 10 are disposed on a first substrate 31, and the second device 20 is disposed on a second substrate 32, which in turn is disposed on the first substrate 31. In an embodiment, the first substrate 31 includes a coarse-pitch substrate such as a printed circuit board (PCB), which may support line width and line spacing (L/S) of approximately 100 micrometers (μm) and 100 μm, respectively. In addition, the second substrate 32 includes a fine-pitch substrate, which may support L/S smaller than approximately 2 μm/2 μm.

In some embodiments, the system 100 is incorporated in an electronic device such as a mobile device including, for example, a smart phone. During an optical communication, the system 100 receives an optical signal from or transmits an optical signal to an external system, such as another electronic device.

The second device 20 in the system 100 may support data transmission at approximately 12.8 tera (T) bytes per second, and thus offers services in a relatively large bandwidth. While the data transmission rate of the second device 20 is rapidly evolving, by comparison, the data transmission rate of the first device 10 is moving slow and may support approximately 400 giga (G) bytes per second. As a result, one such second device 20 is able to serve at least 32 (=12.8 T/400G) such first devices 10. To fully utilize the bandwidth resources of the second device 20, it may be desirable to employ as many as first devices 10 affordable by the second device 20. Moreover, to curb power loss, a first device 10 may be specified to be disposed close to a second device 20. In an embodiment, the first device 10 is disposed within approximately 2 micrometers (mm) from the second device 20. Consequently, given the above, it is desirable to increase the density of first devices 10, which may be arranged to surround the second device 20 within a predetermined range of distance.

Figure 1B:
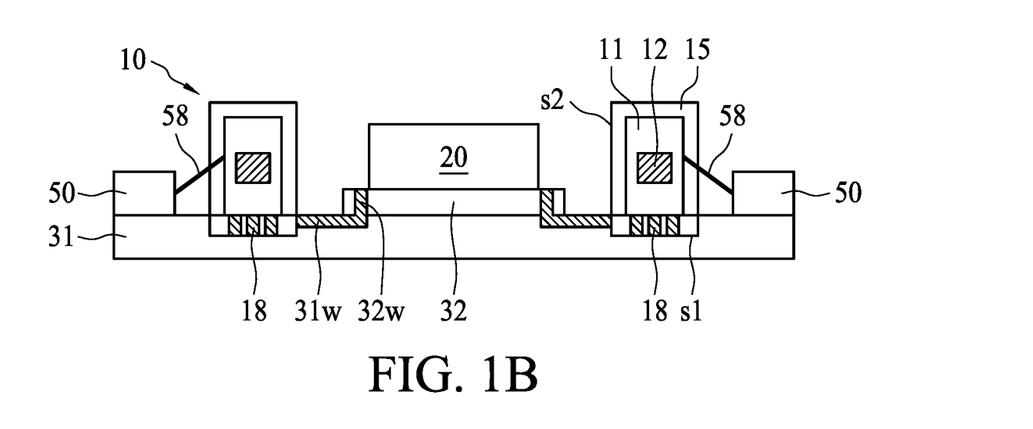
FIG. 1B is a front view of the system illustrated in FIG. 1A, taken along line AA'.

FIG. 1B is a front view of the system 100 illustrated in FIG. 1A, taken along line AA'.

Figure 1C:
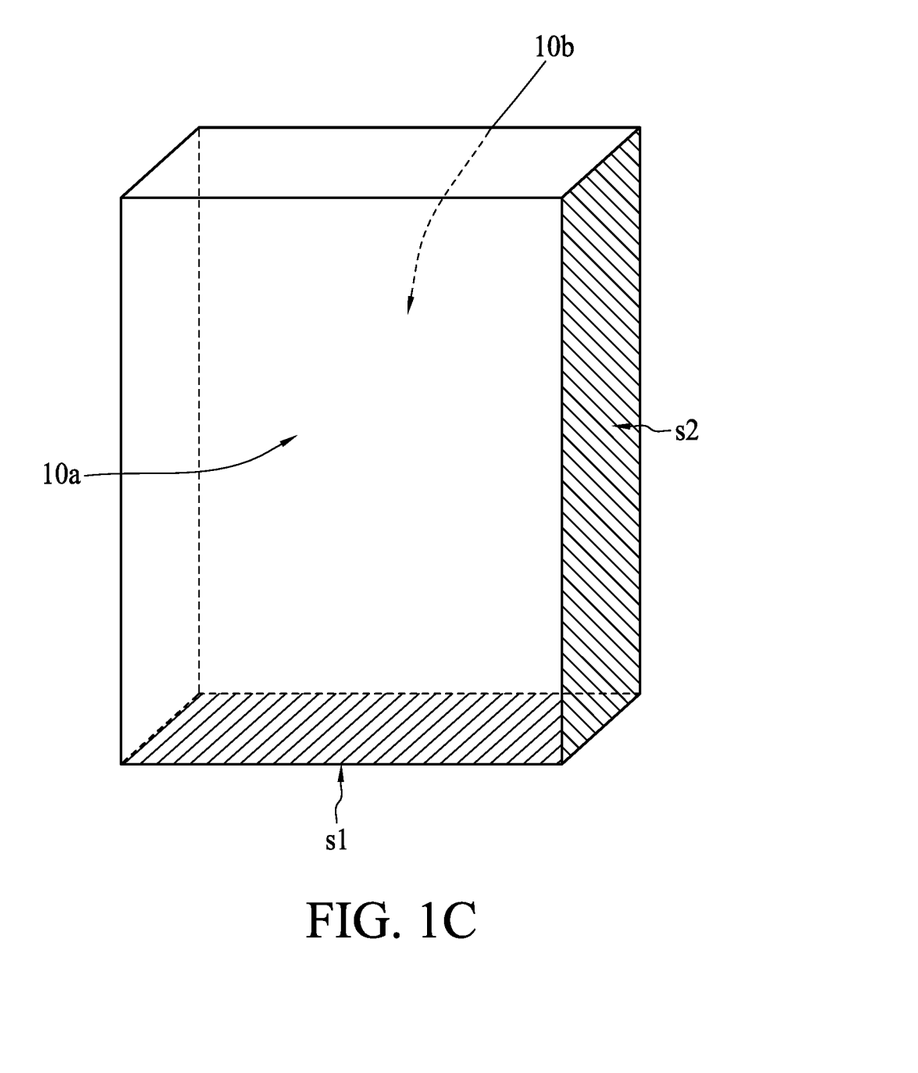
FIG. 1C is a schematic perspective diagram showing an enlarged view of a first device in the system illustrated in FIG. 1B.

Referring to FIG. 1B and also FIG. 1A, to be densely packed, the first device 10 is attached to the first substrate 31 by way of "standing" thereon instead of "lying" on the first substrate 31 as would be so arranged in a comparative system. Generally, a standing posture of an object occupies less contact area than a lying posture. As a result, by standing the first device 10 on the first substrate 31, more space can be created for additional first devices 10. FIG. 1C is a schematic perspective diagram showing an enlarged view of a first device 10 in the system 100 illustrated in FIG. 1B. Referring to FIG. 1C, the first device 10 takes the form of a packaged IC having a compact, flat profile. The first device 10 in a packaged form has planar surfaces s1, s2, 10a and 10b. The planar surfaces s1 and s2, also referred to as a first side and a second side, respectively, are contiguous with each other and each also contiguous with the planar surfaces 10a and 10b. The planar surfaces 10a and 10b, also referred to as a first surface and a second surface, respectively, are opposed to each other, and are larger than the first side s1 and the second side s2 in terms of area. In an embodiment, the dimension of the first device 10 is approximately 3 centimeters (or 30 mm) in length, approximately 2 centimeters (or 20 mm) in width, and approximately 2 mm in thickness. As a result, the area of each of the first surface 10a and the second surface 10b is approximately 600 mm$^2$, and the areas of the first side s1 and the second side s2 are approximately 40 mm$^2$ and approximately 60 mm$^2$, respectively. Accordingly, in terms of area, the first surface 10a or the second surface 10b is approximately 15 times the first side s1 and approximately 10 times the second side s2. That is, each of the first surface 10a and the second surface 10b is not smaller than 10 times the first side s1 or the second side s2. With the significantly small area, standing the first device 10 at the first side s1 or the second side s2 thereof on the first substrate 31 saves a significant amount of area of the first substrate 31.

Alternatively, the first device 10 may take the form of a non-packaged structure including functional modules such as PIC 11 and EIC 12 on a carrier 15, as in the embodiment illustrated in FIG. 1A. The overall dimension of the first device 10 in a non-packaged form, which still has a compact, flat profile, is similar to that in a packaged form. Consequently, like the packaged form, standing the first device 10 at a relatively small-area side thereof on the first substrate 31 achieves area efficiency in the real estate of the first substrate 31, and contributes to a significantly improved density of the first devices 10 on the first substrate 31.

In some comparative systems, optical transceivers thereof are similar in device functions and physical configurations to the first device 10. The optical transceiver is attached at a first surface 10a or a second surface 10b, in a "lying" posture, to a substrate. To accommodate more optical transceivers, an increase in the substrate size is specified, which may not be allowed in the limited inner space of an electronic device, and may deviate from the downsizing trend. As a result, the number of optical transceivers available on a substrate is significantly restricted, resulting in insufficient utilization of the resources of the second device 12. The system 100 according to the present disclosure alleviates or solves the problems that would occur in the comparative systems.

Referring back to FIG. 1B, the first device 10 is attached at the first side s1 thereof to the first substrate 31. The first device 10 is provided with conductive pads 18 arranged at one of the first surface 10a and the second surface 10b adjacent to the first side s1 for electrical connection to the second device 20. Moreover, the first substrate 31 is provided with a socket corresponding in position to the conductive pads 18 so as to accommodate the conductive pads 18. Furthermore, the first substrate 31 and the second substrate 32 are provided with a first wiring 31w and a second wiring 32w, respectively, to establish a conductive path between the first device 10 and the second device 20.

Specifically, the first device 10, when attached onto the first substrate 31, is electrically connected via the conductive pads 18, the first wiring 31w in the first substrate 31 and the second wiring 32w in the second substrate 32 to the second device 20.

Figure 2A:
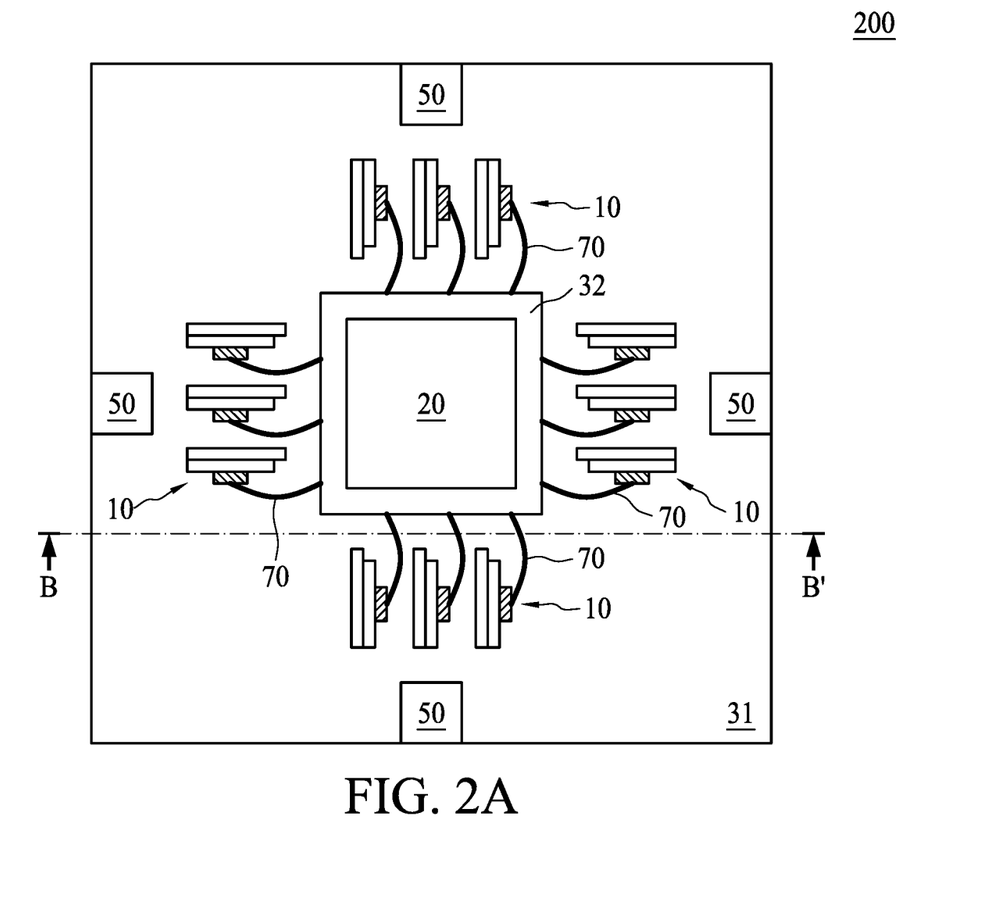
FIG. 2A is a schematic top view of a system comprising optical devices, in accordance with another embodiment of the present disclosure.

FIG. 2A is a schematic top view of a system 200 comprising optical devices 10 and 20, in accordance with another embodiment of the present disclosure. For simplicity, the optical fibers 58 and conductive lines 28 shown in FIG. 1A are omitted.

Referring to FIG. 2A, the system 200 is similar to the system 100 described and illustrated with reference to FIG. 1A except that, for example, flexible circuits 70 replace the conductive pads 18. The flexible circuit 70, such as a flexible circuit board (FCB) or flexible printed circuit board, may include a thin insulating polymer film having conductive circuit patterns affixed thereto and supplied with a thin polymer coating to protect the conductor circuits. The flexible circuit 70 facilitates electrical connection between the first device 70 and the second device 20 over the space.

Figure 2B:
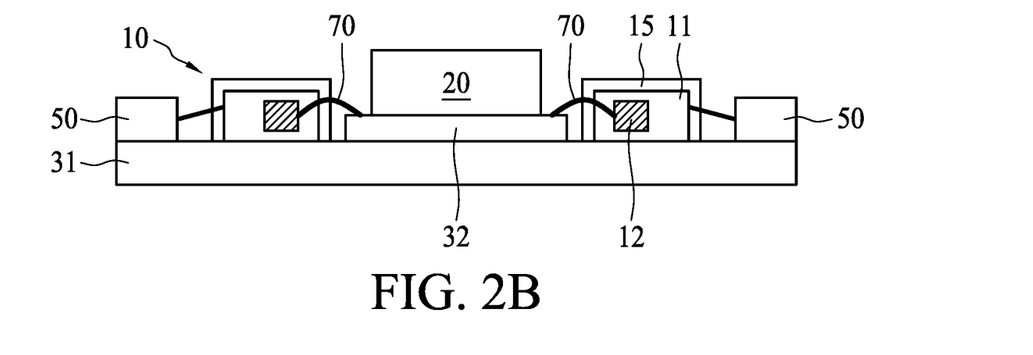
FIG. 2B is a front view of the system illustrated in FIG. 2A, taken along line BB'.
Figure 2C:
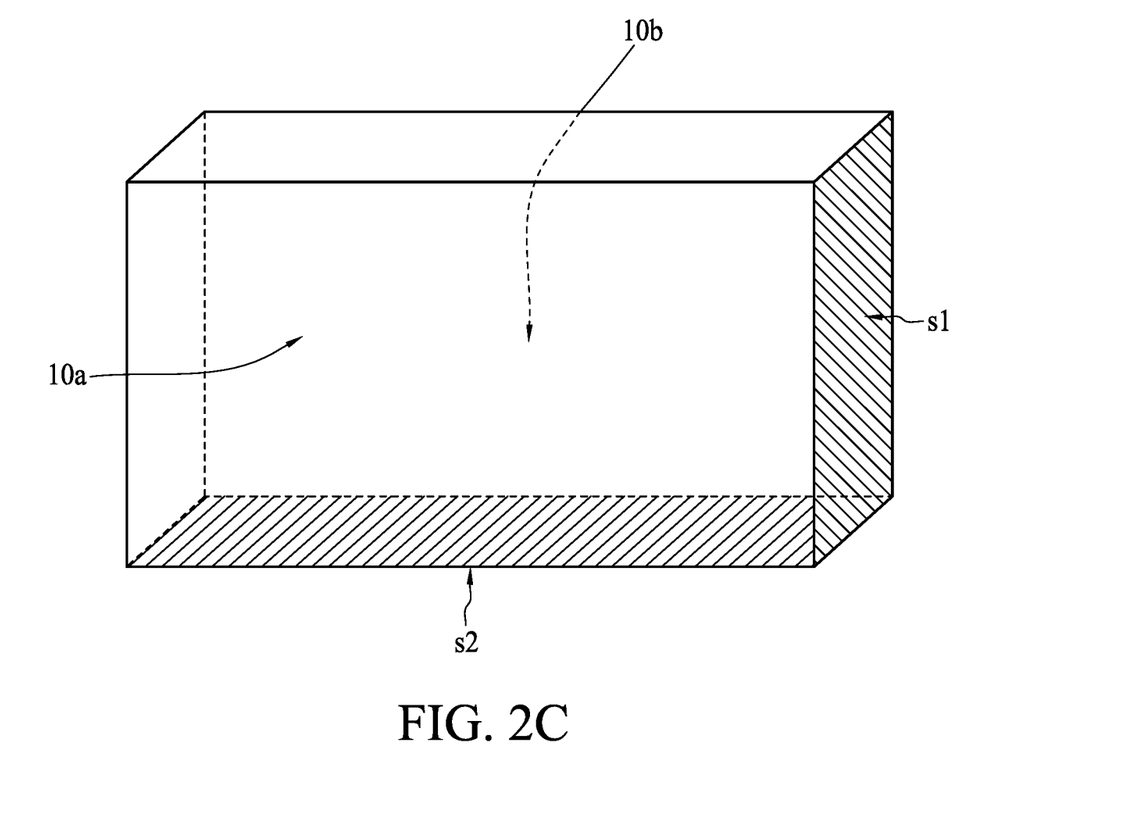
FIG. 2C is a schematic perspective diagram showing an enlarged view of a first device in the system illustrated in FIG. 2B.

FIG. 2B is a front view of the system 200 illustrated in FIG. 2A, taken along line BB'. FIG. 2C is a schematic perspective diagram showing an enlarged view of a first device 10 in the system 200 illustrated in FIG. 2B.

Referring to FIG. 2B and also FIG. 2C, the first device 10 is attached at the second side s2 thereof to the first substrate 31. Since the second side s2 is larger than the first side s1 in area, the second side s2 facilitates the first device 10 to stand more stable on the first substrate 31. Alternatively, as in the system 100, the first device 10 may be attached at the first side s1 thereof to the first substrate 31.

Figure 3A:
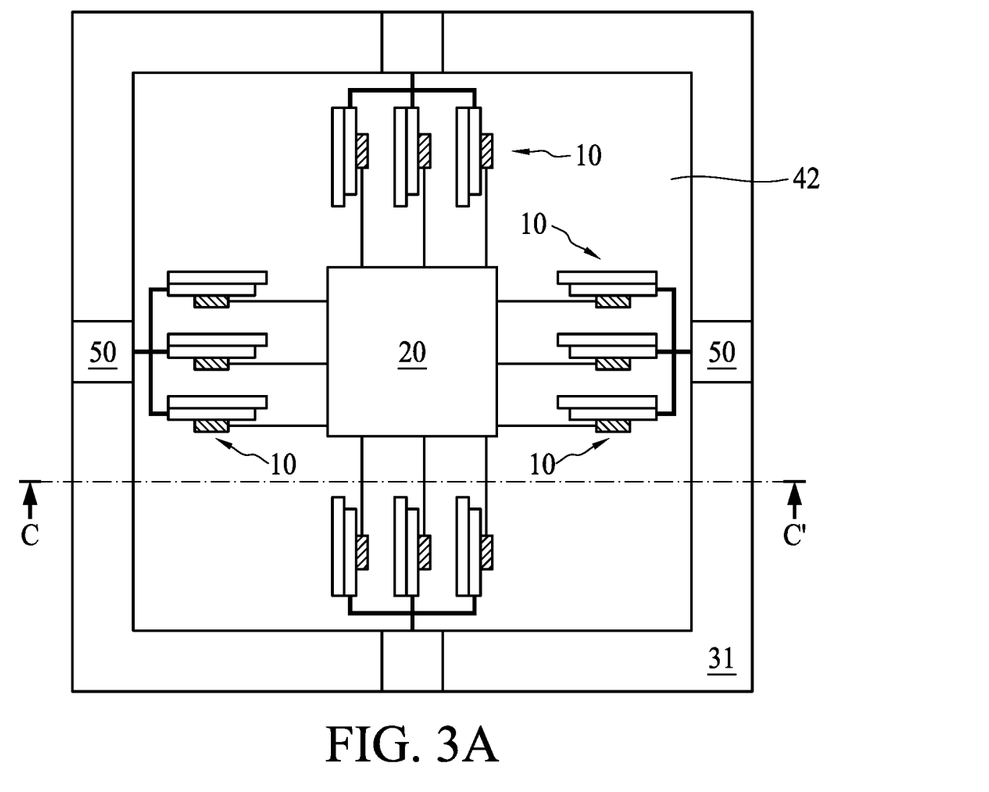
FIG. 3A is a schematic top view of a system comprising optical devices, in accordance with still another embodiment of the present disclosure.
Figure 3B:
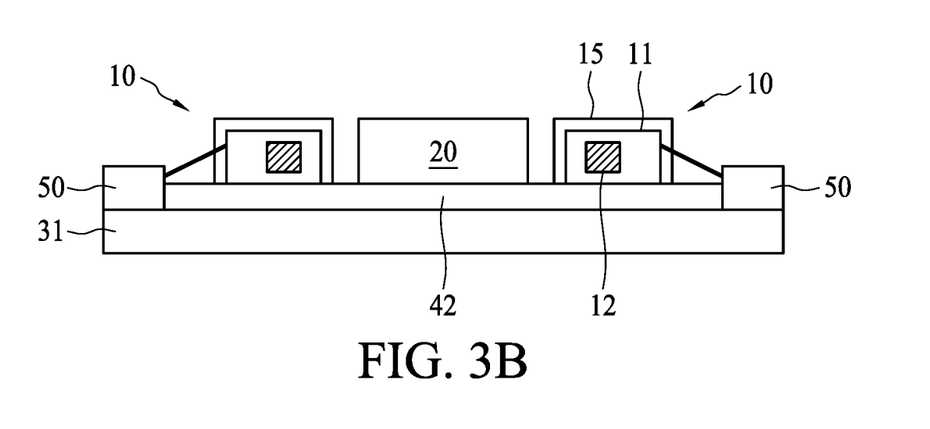
FIG. 3B is a front view of the system illustrated in FIG. 3A, taken along line CC'.

FIG. 3A is a schematic top view of a system 300 comprising optical devices 10 and 20, in accordance with still another embodiment of the present disclosure. FIG. 3B is a front view of the system 300 illustrated in FIG. 3A, taken along line CC'.

Referring to FIG. 3A and also FIG. 3B, the system 300 is similar to the system 100 described and illustrated with reference to FIG. 1A except that, for example, the first devices 10 are disposed on a second substrate 42 rather than the first substrate 31. Moreover, the second substrate 42 is similar to the second substrate 32 described and illustrated with reference to FIG. 1A except that, for example, the second substrate 42 is larger than the second substrate 32 in terms of area so as to accommodate the first devices 10 in addition to the second device 20. The first device 10 may be electrically connected to the second device 20 by conductive pads and a wiring structure as described and illustrated with reference to FIGS. 1A and 1B. Alternatively, the first device 10 may be electrically connected to the second device 20 by a flexible circuit as described and illustrated with reference to FIGS. 2A and 2B. In addition, as in the present embodiment, the first device 10 may be attached at the second side s2 thereof to the first substrate 31 or, as in the system 100, the first device 10 may be attached at the first side s1 thereof to the first substrate 31.

Figure 4A:
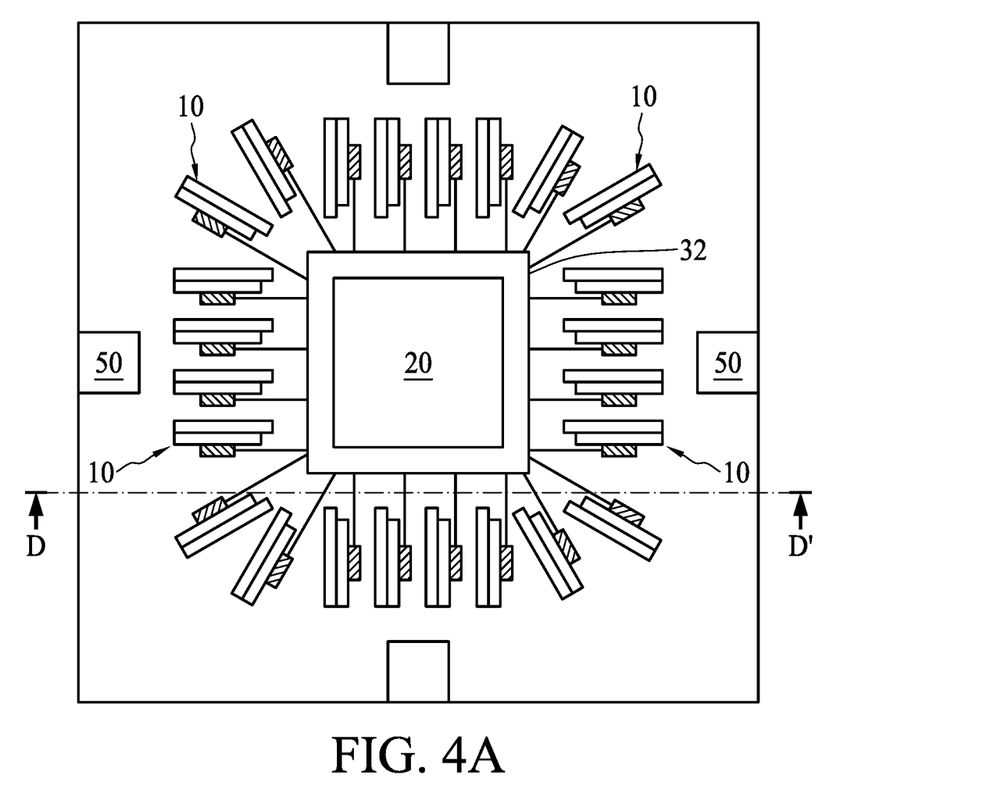
FIG. 4A is a schematic top view of a system comprising optical devices, in accordance with yet another embodiment of the present disclosure.
Figure 4B:
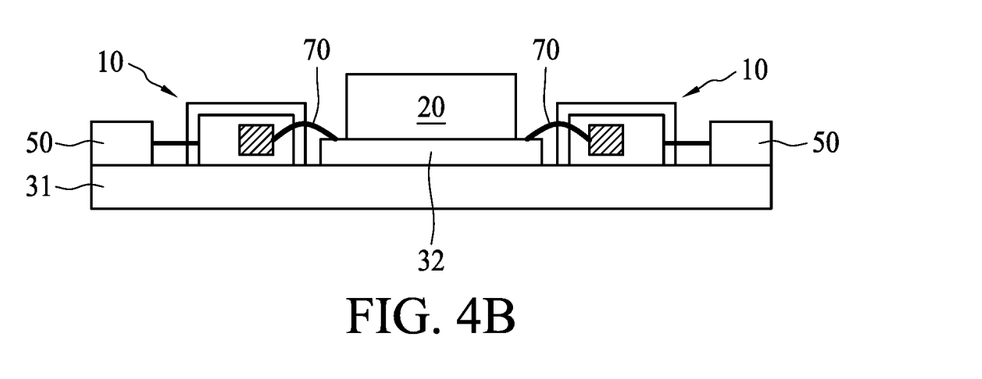
FIG. 4B is a front view of the system illustrated in FIG. 4A, taken along line DD'.

FIG. 4A is a schematic top view of a system 400 comprising optical devices 10 and 20, in accordance with yet another embodiment of the present disclosure. FIG. 4B is a front view of the system 400 illustrated in FIG. 4A, taken along line DD'. For simplicity, the optical fibers 58 and conductive lines 28 shown in FIG. 1A are omitted.

Referring to FIG. 4A and also FIG. 4B, the system 400 is similar to the system 100 described and illustrated with reference to FIG. 1A except that, for example, additional first devices 10 are shown. These additional first devices 10 together with those already shown in FIG. 1A substantially surround the second device 20. Each of the first devices 10 may be disposed with a predetermined distance, for example, 2 μm from the second device 20. In the present embodiment, the first device 10 may be attached at the second side s2 thereof to the first substrate 31. In other embodiments, as in the system 100, the first device 10 may be attached at the first side s1 thereof to the first substrate 31. Due to the standing posture, the first devices 10 are densely packed around the second device 20. As a result, the density of first devices 10 is increased. Moreover, the bandwidth resources of the second device 20 may be fully utilized.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A system comprising optical devices, the system comprising:
    a first substrate;
    a first device, for optical communication, having a first surface, a second surface opposite to the first surface, and a first side contiguous with the first surface and the second surface, the first side is smaller than one of the first surface and the second surface in terms of area, the first device attached at the first side thereof to the first substrate;
    a second device, on the first substrate, to serve the first device during an optical communication; and
    additional first devices attached at their respective first sides to the first substrate, the additional first devices together with the first device surrounding the second device.

2. The system of claim 1, wherein the first device has a second side contiguous with the first surface, the second surface and the first side, the second side larger than the first side in terms of area.

3. The system of claim 1, wherein the first device includes conductive pads arranged, on one of the first surface and the second surface, adjacent to the first side.

4. The system of claim 3, wherein the first substrate includes a socket to accommodate the conductive pads of the first device.

5. The system of claim 3 further comprising:
    a second substrate on the first substrate, wherein the second device is disposed on the second substrate.

6. The system of claim 5, wherein the conductive pads of the first device are electrically connected via the first substrate and the second substrate towards the second device.

7. The system of claim 1 further comprising a flexible circuit electrically connected to the first device.

8. The system of claim 7 further comprising:
    a second substrate on the first substrate, wherein the second device is disposed on the second substrate.

9. The system of claim 8, wherein the first device is electrically connected via the flexible circuit and the second substrate towards the second device.

10. The system of claim 1, wherein the first device includes a first module configured to convert an optical signal into an electric signal, and a second module configured to demodulate the electric signal.

11. The system of claim 10, wherein the second module is configured to generate a modulated optical signal, and the first module is configured to transmit the modulated optical signal.

12. The system of claim 1, wherein one of the first surface and the second surface is not smaller than ten times the first side in terms of area.

13. A system comprising optical devices, the system comprising:
    a substrate;
    a first device, for optical communication, having a first planar surface smaller than a second planar surface in terms of area, the first device attached at the first planar surface thereof to the substrate;
    a second device, on the substrate, to serve the first device during an optical communication; and
    additional first devices attached at their respective first planar surfaces to the substrate, the additional first devices together with the first device surrounding the second device.

14. The system of claim 13, wherein the first device includes conductive pads arranged, on the second planar surface, adjacent to the first planar surface.

15. The system of claim 13 further comprising a flexible circuit electrically connected between the first device and the second device.

16. The system of claim 13, wherein the first device includes a first module configured to convert an optical signal into an electric signal, and a second module configured to demodulate the electric signal.

17. The system of claim 16, wherein the second module is configured to generate a modulated optical signal, and the first module is configured to transmit the modulated optical signal.

* * * * *